US007746832B2

(12) United States Patent
Odenwalder

(10) Patent No.: US 7,746,832 B2
(45) Date of Patent: Jun. 29, 2010

(54) METHOD AND APPARATUS FOR SUPPORTING ADAPTIVE MULTI-RATE (AMR) DATA IN A CDMA COMMUNICATION SYSTEM

(75) Inventor: Joseph P. Odenwalder, Rancho Santa Fe, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 11/266,623

(22) Filed: Nov. 2, 2005

(65) Prior Publication Data

US 2006/0050666 A1 Mar. 9, 2006

Related U.S. Application Data

(63) Continuation of application No. 09/755,843, filed on Jan. 5, 2001, now Pat. No. 7,010,001.

(51) Int. Cl.
*H04B 7/216* (2006.01)

(52) U.S. Cl. ................ 370/335; 370/252; 370/332; 370/342; 370/465; 370/470; 714/758

(58) Field of Classification Search ................ 370/252, 370/332, 335, 342, 465, 470; 714/758
See application file for complete search history.

(56) References Cited

U.S. PATENT DOCUMENTS 5,282,019 A    1/1994    Basile et al.

(Continued)

FOREIGN PATENT DOCUMENTS

WO    95008888    3/1995

(Continued)

OTHER PUBLICATIONS

ETSI TS 125.211 v3.5.0 (2000-12); Universal Mobile Telecommunications Systems (UMTS); Physical channels and mapping of transport channels onto physical channels (FDD),'3GPP TS 25.211 version 3.5.0 Release 1999). Dec. 22, 2000.

(Continued)

*Primary Examiner*—William Trost, IV
*Assistant Examiner*—Toan D Nguyen
(74) *Attorney, Agent, or Firm*—Sayed H. Beladi; Anthony P. Mauro

(57) ABSTRACT

Techniques to support adaptive multi-rate (AMR) coded data in a cdma2000 communication system. A number of AMR modes are defined for speech information (of various rates), silence descriptor (SID) (of various types), and blank frame. The speech and SID data are provided in frames conforming to frame formats defined by the cdma2000 system. A CRC is used for each AMR frame (e.g., 12-bit CRC for speech and 8-bit CRC for SID). The AMR data and CRC bits are further coded with a convolutional encoder. Blind rate detection is used to detect the frame rate of the transmitted AMR frames. To support blind rate detection, the number of bits provided to the CRC generator is different for each blind rate to be detected. If two or more blind rates have the same number of bits (such as for SID), then format bits are provided to distinguish between these rates.

15 Claims, 6 Drawing Sheets

U.S. PATENT DOCUMENTS

| | | | |
|---|---|---|---|
| 5,671,255 | A | 9/1997 | Wang et al. |
| 5,710,784 | A | 1/1998 | Kindred et al. |
| 5,751,725 | A | 5/1998 | Chen |
| 5,774,496 | A | 6/1998 | Butler et al. |
| 5,859,843 | A | 1/1999 | Honkasalo |
| 6,108,372 | A | 8/2000 | Tidemann, Jr. et al. |
| 6,141,353 | A | 10/2000 | Li |
| 6,347,081 | B1 | 2/2002 | Bruhn |
| 6,370,672 | B1 | 4/2002 | Rick et al. |
| 6,424,631 | B1 | 7/2002 | Czaja et al. |
| 6,490,268 | B1 | 12/2002 | Lee et al. |
| 6,690,734 | B1 | 2/2004 | Lunnby |
| 6,697,343 | B1 | 2/2004 | Kamel et al. |
| 7,187,708 | B1 | 3/2007 | Shiu |

FOREIGN PATENT DOCUMENTS

| | | |
|---|---|---|
| WO | 97018643 | 7/1996 |
| WO | 98/10552 A2 | 3/1998 |
| WO | 99/48237 A1 | 9/1999 |
| WO | 99/60742 A1 | 11/1999 |

OTHER PUBLICATIONS

ETSI TS 125 212 v3.5.0 (200-12); Universal Mobile Telecommunications System (UMTS): Multiplexing and channel coding (FDD). '3GPP TS 25.212 version 3.5.0 Release 1999) Dec. 22, 2000.

ETSI TS 125 213 v3.4.0 (200-12): Universal Mobile telecommunications System (UMTS); Spreading and modulation (FDD); 3GPP TS 25.213 version 3.4.0 Release 1999) Dec. 22, 2000.

ETSI TS 125 214 v3.5.0(200-12); Universal Mobile Telecommunications System (UTMS): Physical Layer Procedures (FDD); '3GPP TS 25.214 version 3.5.0 Release 1999) Dec. 22, 2000.

ETSI EN 301 704 v7.2.1 (200-04); "Digital Cellular Telecommunications System; Adaptive Multi-Rate(AMR) Speech Transcoding," GSM 06 90 version 7.2.1 Release 1998. May 9, 2000.

International Search Report - PCT/US01/00706, International Search Authority - European Patent Office - Jun. 1, 2001.

International Preliminary Examination Report - PCT/US01/000706 - IPEA/US - Sep. 4, 2003.

Rao, et al., "Third-Generation (3G) Radio Access Standards", IEEE XPO1052655 Communication Technology Proceeding, 2000, WCC-ICCT 2000, Aug. 2000.

US 7,746,832 B2

METHOD AND APPARATUS FOR SUPPORTING ADAPTIVE MULTI-RATE (AMR) DATA IN A CDMA COMMUNICATION SYSTEM

CROSS REFERENCE TO RELATED APPLICATIONS

Claim of Priority Under 35 U.S.C. §120

The present Application for Patent is a Continuation and claims priority to patent application Ser. No. 09/755,843 entitled "Method and Apparatus for Supporting Adaptive Multi-Rate (AMR) Data in a CDMA Communication System" filed Jan. 5, 2001, now U.S. Pat. No. 7,010,001 now allowed, and assigned to the assignee hereof and hereby expressly incorporated by reference herein.

This application claims the benefit of provisional U.S. application Ser. No. 60/175,371, entitled "ACCOMMODATING THE WCDMA AMR DATA RATES IN IS-2000 MC," filed Jan. 10, 2000, which is incorporated herein by reference in its entirety for all purposes.

BACKGROUND OF THE INVENTION

I. Field of the Invention

The present invention relates to data communication. More particularly, the present invention relates to novel and improved method and apparatus for supporting the adaptive multi-rate (AMR) speech codec data in a cdma2000 communication system.

II. Description of the Related Art

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of system, including increased system capacity.

A system may be designed to support one or more standards such as (1) the "TIA/EIA/IS-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and TR-45.5 (the cdma2000 standard, formerly called IS-2000 MC), or (4) some other standard. These standards are incorporated herein by reference.

Each standard specifically defines the processing of data for transmission on the forward and reverse links. For example, speech information may be coded at a particular data rate, formatted into a defined frame format, and processed (e.g., error correction and/or detection encoded, interleaved, and so on) in accordance with a particular processing scheme. The frame formats and processing defined by a particular standard (e.g., cdma2000 standard) is likely to be different from those of other standards (e.g., W-CDMA standard).

The W-CDMA standard defines an Adaptive Multi-Rate (AMR) speech coding scheme whereby speech information may be encoded based on one of a number of possible data rates and the coded speech data is provided in a particular format that depends on the selected data rate.

For compatibility and interoperability between various types of communication system, it is highly desirable to provide a cdma2000 system capable of supporting AMR coded speech data.

SUMMARY OF THE INVENTION

The present invention provides techniques to support adaptive multi-rate (AMR) coded data in a cdma2000 communication system. A number of AMR modes are defined for speech information, silence descriptor (SID), and blank frame, as described in further detail below. The AMR modes for speech information support a number of AMR speech data rates (e.g., as defined by the AMR standard identified below). The AMR modes for SID data support a number of types of SID. The speech and SID data are provided in 20 msec frames.

For an implementation in a cdma2000 system, the AMR modes are supported by a number of radio configurations on the forward and reverse links using the flexible rate feature supported by the cdma2000 standard. In an embodiment, a 12-bit CRC is selected for AMR speech frames and an 8-bit CRC is selected for SID frames. These CRC selections provide good performance while minimizing the number of overhead bits used for each frame. The AMR data and CRC bits are further coded with a convolutional encoder having a particular code rate, as defined for the radio configurations by the cdma2000 standard.

In another aspect, blind rate detection is used to detect the frame rate of received AMR frames. With blind rate detection, each received frame is decoded based on a number of hypotheses, with each hypothesis associated with a particular set of decoding parameter values used to decode the received frame. To support blind rate detection, the number of bits provided to the CRC generator is different for each of the possible blind rates to be detected (i.e., each of the AMR modes desired to be detected separately). If two or more blind rates have the same number of bits, then additional overhead (format) bits are provided to distinguish between these rates.

The invention further provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
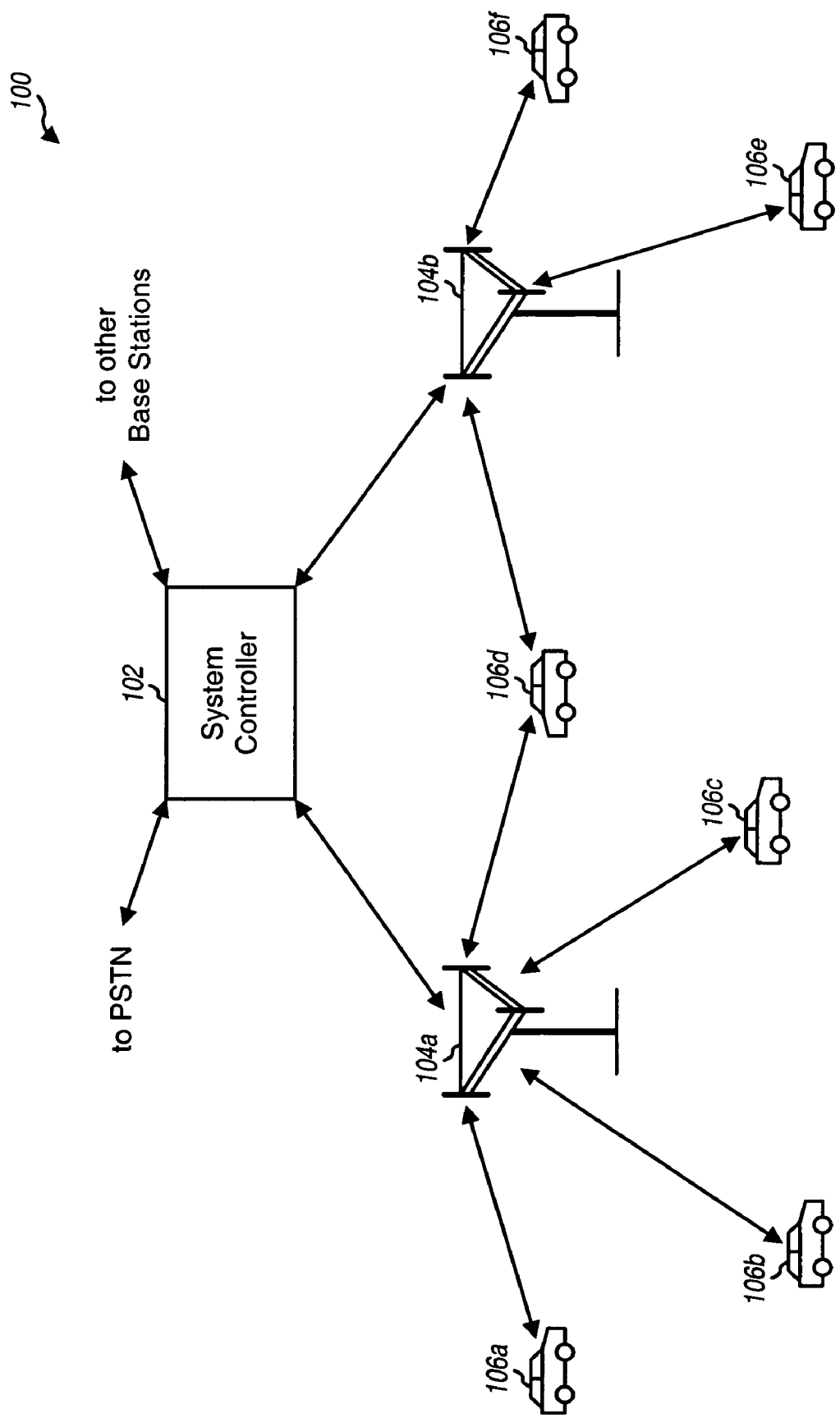
FIG. 1 is a diagram of a spread spectrum communication system that supports a number of users.

FIG. 1 is a diagram of a spread spectrum communication system 100 that supports a number of users. System 100 provides communication for a number of cells, with each cell being serviced by a corresponding base station 104. Various remote terminals 106 are dispersed throughout the system. Each remote terminal 106 may communicate with one or more base stations 104 on the forward and reverse links at any particular moment, depending on whether or not the remote terminal is active and whether or not it is in soft handoff. As shown in FIG. 1, base station 104a communicates with remote terminals 106a, 106b, 106c, and 106d, and base station 104b communicates with remote terminals 106d, 106e, and 106f.

A system controller 102 couples to base stations 104 and may further couple to a public switched telephone network (PSTN). System controller 102 provides coordination and control for the base stations coupled to it. System controller 102 further controls, via base stations 104, the routing of telephone calls among remote terminals 106, and between remote terminals 106 and the users coupled to PSTN (e.g., conventional telephones). System controller 102 is also referred to as a base station controller (BSC).

System 100 may be designed to conform to the cdma2000 standard, the W-CDMA standard, some other standard, or a combination thereof.

Figure 2:
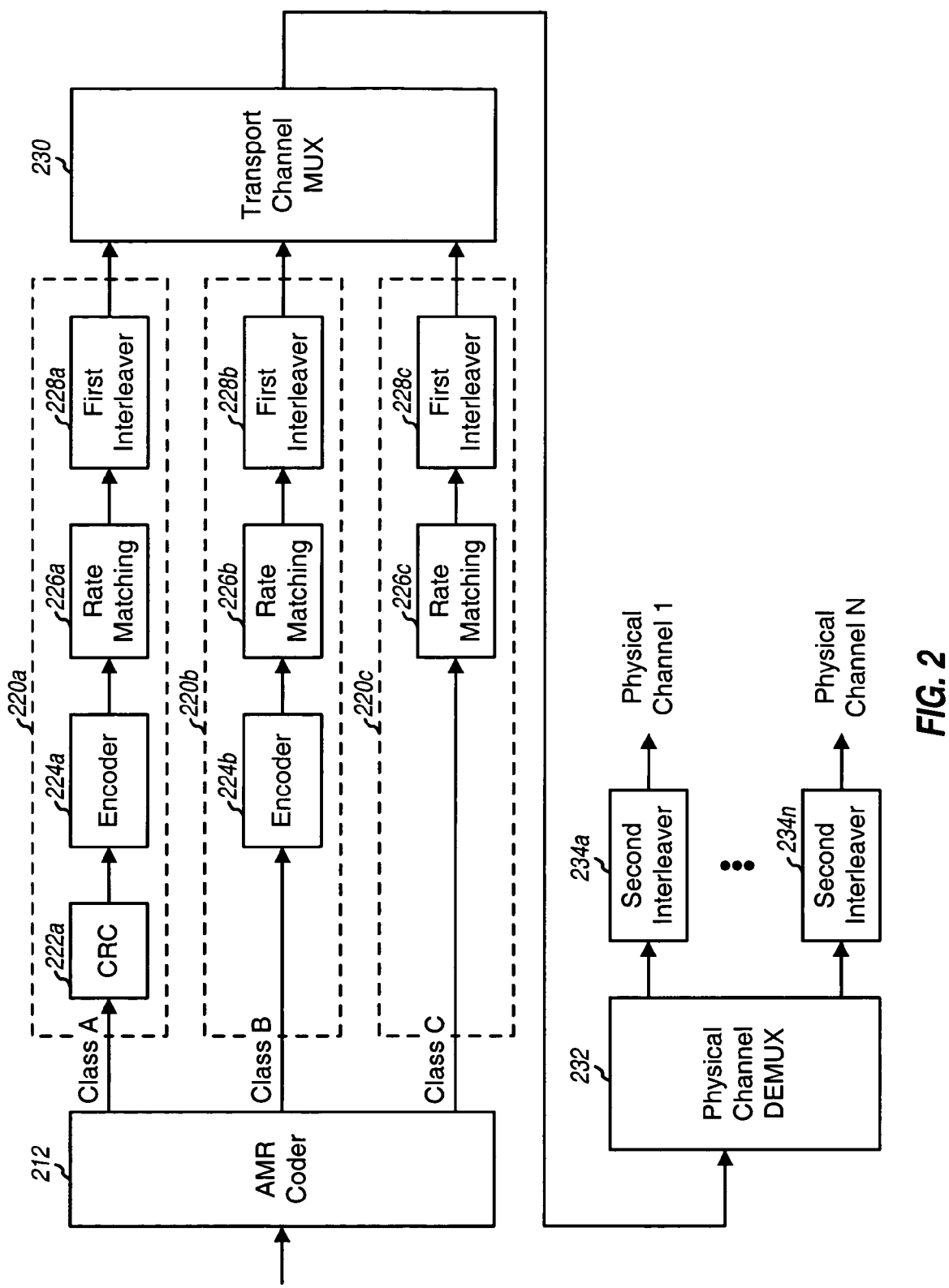
FIG. 2 is a block diagram of the processing for an AMR data transmission in accordance with the W-CDMA standard.

FIG. 2 is a block diagram of the processing for an AMR data transmission in accordance with the W-CDMA standard. An adaptive multi-rate (AMR) speech coder 212 receives and codes a speech signal and provides coded speech data that is grouped into three classes labeled as Class A, Class B, and Class C. Class A bits are the most important bits, Class B bits are the next most important, and Class C bits are the least important. Because of the designated difference in importance, the bits for each class are transmitted via a different "transport" channel capable of providing different processing (e.g., error correction and detection coding, rate matching, and so on), which may be selected to be commensurate with the level of importance of the class. For example, convolutional encoding and cyclic redundancy check (CRC) may be employed for Class A bits, convolutional encoding but no CRC may be employed for Class B bits, and no convolutional encoding or CRC may be employed for Class C bits.

In the specific implementation shown in FIG. 2, Class A bits are CRC coded (block 222a), convolutionally encoded (block 224a), rate matched (block 226a), and interleaved (block 228a) within a transport channel processor 220a. Class B bits are convolutionally encoded (block 224b), rate matched (block 226b), and interleaved (block 228b) within a transport channel processor 220b. And Class C bits are rate matched (block 226c) and interleaved (block 228c) within a transport channel processor 220c. The processed bits from transport channel processors 220a through 220c are then multiplexed into a coded composite transport channel (CCTrCH) by a transport channel multiplexer 230, and the CCTrCH is further demultiplexed into one or more physical channel streams by a physical channel demultiplexer 232. Each (20 msec) frame on each physical channel stream is further interleaved (block 234), and the resultant data stream comprises the data for the physical channel.

The data processing for the W-CDMA standard is described in further detail in the W-CDMA standard documents and in U.S. patent application Ser. No. 09/678,645, entitled "DATA BUFFER STRUCTURE FOR PHYSICAL AND TRANSPORT CHANNELS IN A CDMA SYSTEM," filed Oct. 3, 2000, assigned to the assignee of the present application and incorporated herein by reference. AMR coder 212 may be designed to conform to the "ETSI EN 301 704 Digital Cellular Telecommunications System; Adaptive Multi-Rate (AMR) Speech Transcoding" (the AMR standard).

Figure 3:
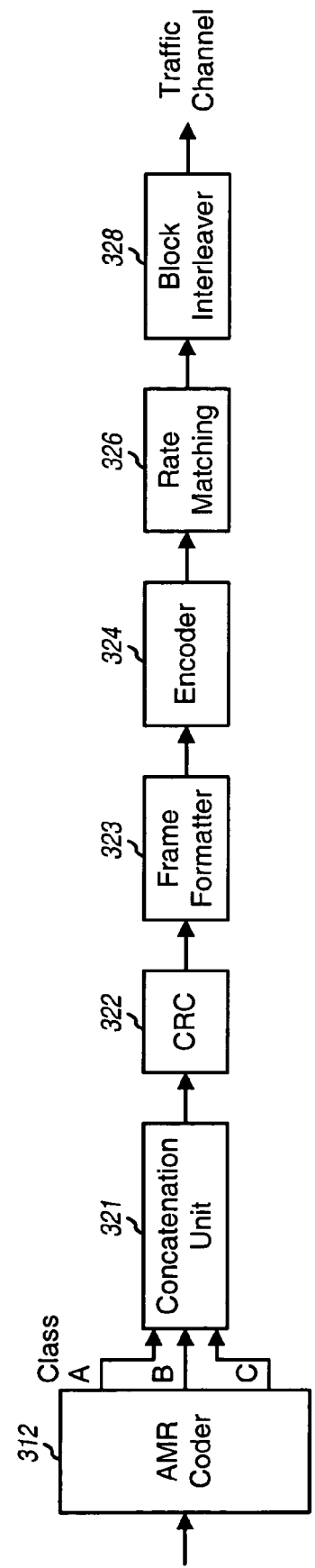
FIG. 3 is a block diagram of the processing for an AMR data transmission in accordance with the cdma2000 standard.

FIG. 3 is a block diagram of the processing for an AMR data transmission in accordance with the cdma2000 standard. An adaptive multi-rate (AMR) speech coder 312 receives and codes a speech signal and provides coded speech data that is grouped into three classes labeled as Class A, Class B, and Class C. AMR coder 312 may also be designed to conform to the aforementioned AMR standard. The three classes of bits are provided to a concatenation unit 321 that forms data blocks, with each data block being transmitted in a frame and having a combination of bits from Class A, Class B, and possibly Class C. Each data block is then CRC coded (block 322), formatted (block 323), convolutionally encoded (block 324), rate matched (block 326), and interleaved (block 328). The resultant data stream comprises the data for a traffic channel (e.g., a fundamental or supplemental channel in the cdma2000 system).

FIG. 3 shows an implementation for supporting AMR speech data in the cdma2000 system. In an embodiment, the Class A, B, and C bits are treated as Class A bits (the most-reliable bits), and error-correcting coding and CRC are provided for all three classes of bits. For an AMR speech frame, one CRC is generated for all data bits (i.e., all three classes of bits). A single tailed-off convolutional encoder is also used for all bits in the frame.

The CRC coding in block 322 generates a number of CRC bits (e.g., an 8-bit or 12-bit CRC value) for each received data block based on a particular generator polynomial. The number of CRC bits to be included with each data block is selected to provide a high likelihood of correctly detecting whether or not a frame has been received in error, while minimizing the number of overhead bits. In an embodiment, an 8-bit CRC value is employed for lower rate frames (e.g., having 80 data bits or less), and a 12-bit CRC value is employed for higher rate frames (e.g., having up to 267 data bits). The polynomial generators used to generate the 8-bit and 12-bit CRC values may be as follows:

$$g(x)=x^{12}+x^{11}+x^{10}+x^9+x^8+x^4+x+1, \text{ for 12-bit CRC}$$

$$g(x)=x^8+x^7+x^4+x^3+x+1 \text{ for 8-bit CRC}$$

CRC values of other lengths (e.g., 6-bit, 10-bit, 16-bit, and so on) may also be used and are within the scope of the invention. Also, other types of frame quality indicator may also be used instead of CRC, and this is also within the scope of the invention. Other types of frame quality indicator that may be used include decoder metrics, re-encoded symbol error rate, and others.

The frame formatting in block 323 generates a data frame of a defined format. For some AMR modes, additional overhead bits may be added with the data bits such that the frames for these modes have a particular fixed length (e.g., 43 bits), as described in further detail below. Also, a number of encoder tail bits (e.g., 8 bits of zeros) are appended to the end of each data block. These tail bits are used to flush the convolutional encoder to a known state (all zeros) at end of each data block, so that the encoding of the next data block starts from the known state.

The rate matching in block 326 may be achieved by repeating each bit in a frame N times (wherein N may be 1, 2, 4, 8, or some other value) and puncturing (i.e., deleting) zero or some of the bits in accordance with a particular puncturing pattern. The puncturing pattern may be generated based on a particular algorithm. For AMR data, the puncturing may be achieved as described in U.S. Pat. No. 6,690,734, entitled "METHOD AND APPARATUS FOR PUNCTURING CODE SYMBOLS IN A COMMUNICATIONS SYSTEM," issued Feb. 10, 2004, assigned to the assignee of the present application and incorporated herein by reference.

The data format and processing for the cdma2000 standard is described in further detail in the cdma2000 standard documents.

Table 1 lists the AMR modes specified by the W-CDMA standard, and the number of bits for Classes A, B, and C for each AMR mode. The classification of the bits into three classes, the number of bits for each class, and/or the total number of bits for each data block may be different from those listed in Table 1.

As shown in Table 1, AMR modes 0 through 7 are assigned to eight different AMR speech data rates ranging from 4.75 kbps to 12.2 kbps. AMR modes 8 through 11 or sending different types of silence descriptor (SID) information. AMR modes 12-14 are reserved for future use, and AMR mode 15 represents no data transmission. As shown in Table 1, the total number of bits in a frame ranges from 1 to 244. The reverse link (RL) speech rate bits in the last column of Table 1 are used to reverse link rate, and are only needed for a forward link frame.

11. The remaining bits not used for SID data or as format bits are reserved, as shown in Table 2.

TABLE 2

Forward Link Information Bits for the SID Modes

| | Format Bits | | | Bits/Frame | |
|---|---|---|---|---|---|
| AMR Mode Index | Max Rate Indicator (MR) | Mode Indicator (MI) | Reserved | SID Data | RL Rate Bits | Total Information Bits |
| 8 | '0' | '00' | 1 | 39 | 3 | 46 |
| 9 | '1' | — | 0 | 42 | 3 | 46 |
| 10 | '0' | '10' | 2 | 38 | 3 | 46 |
| 11 | '0' | '11' | 3 | 37 | 3 | 46 |

Table 3 lists a specific definition of the format bits for the four SID types for the reverse link. The max rate indicator (MR) bit and mode indicator (MI) bits are defined the same as for the forward link. However, 43 bits are included in each SID frame since the three reverse link rate bits are not required for the reverse link SID frame.

TABLE 1

AMR Modes

| | | Number of Bits/20-msec Block | | | | |
|---|---|---|---|---|---|---|
| AMR Mode Index | Mode Description | Total Class A, B, & C | Class A | Class B | Class C | RL Speech Rate |
| 0 (AMR4.75) | 4.75 kbps Speech | 95 | 39 | 56 | 0 | 3 |
| 1 (AMR5.15) | 5.15 kbps Speech | 103 | 49 | 54 | 0 | 3 |
| 2 (AMR5.90) | 5.90 kbps Speech | 118 | 55 | 63 | 0 | 3 |
| 3 (AMR6.70) | 6.70 kbps Speech | 134 | 58 | 76 | 0 | 3 |
| 4 (AMR7.40) | 7.40 kbps Speech | 148 | 61 | 87 | 0 | 3 |
| 5 (AMR7.95) | 7.95 kbps Speech | 159 | 75 | 84 | 0 | 3 |
| 6 (AMR10.2) | 10.2 kbps Speech | 204 | 65 | 99 | 40 | 3 |
| 7 (AMR12.2) | 12.2 kbps Speech | 244 | 81 | 103 | 60 | 3 |
| 8 | GSM-AMR SID | 39 | 39 | 0 | 0 | 3 |
| 9 | GSM-EFR SID | 42 | 42 | 0 | 0 | 3 |
| 10 | IS-641 SID | 38 | 38 | 0 | 0 | 3 |
| 11 | PDC-EFR SID | 37 | 37 | 0 | 0 | 3 |
| 12–14 | For Future Use | TBD | TBD | TBD | TBD | 3 |
| 15 | No Transmission | 0 | 0 | 0 | 0 | 3 |

In an embodiment, the frames for the four types of SID (i.e., for AMR modes 8 through 11) are designed to have the same length (e.g., 46 bits for the forward link and 43 bits for the reverse link). The same frame length allows for easy detection of SID frames from other frame types. The length of the SID frames is determined based on the most number of data bits to be transmitted for a SID (i.e., 42 bits, for AMR mode 9) and a sufficient number of additional format bits (e.g., one bit) to identify and distinguish the four SID types.

Table 2 lists a specific definition of the format bits for the four SID types for the forward link. A maximum rate indicator (MR) bit denotes whether or not the SID frame is for AMR mode 9. If the SID frame is not for AMR mode 9, then two additional format bits are used for the mode indicator (MI), which identify the SID frame as either AMR mode 8, 10, or

TABLE 3

Reverse Link Information Bits for the SID Modes

| | Format Bits | | | Bits/Frame | |
|---|---|---|---|---|---|
| AMR Mode Index | Max Rate Indicator (MR) | Mode Indicator (MI) | Reserved | SID Data | Total Information Bits |
| 8 | '0' | '00' | 1 | 39 | 43 |
| 9 | '1' | — | 0 | 42 | 43 |
| 10 | '0' | '10' | 2 | 38 | 43 |
| 11 | '0' | '11' | 3 | 37 | 43 |

Figure 4:
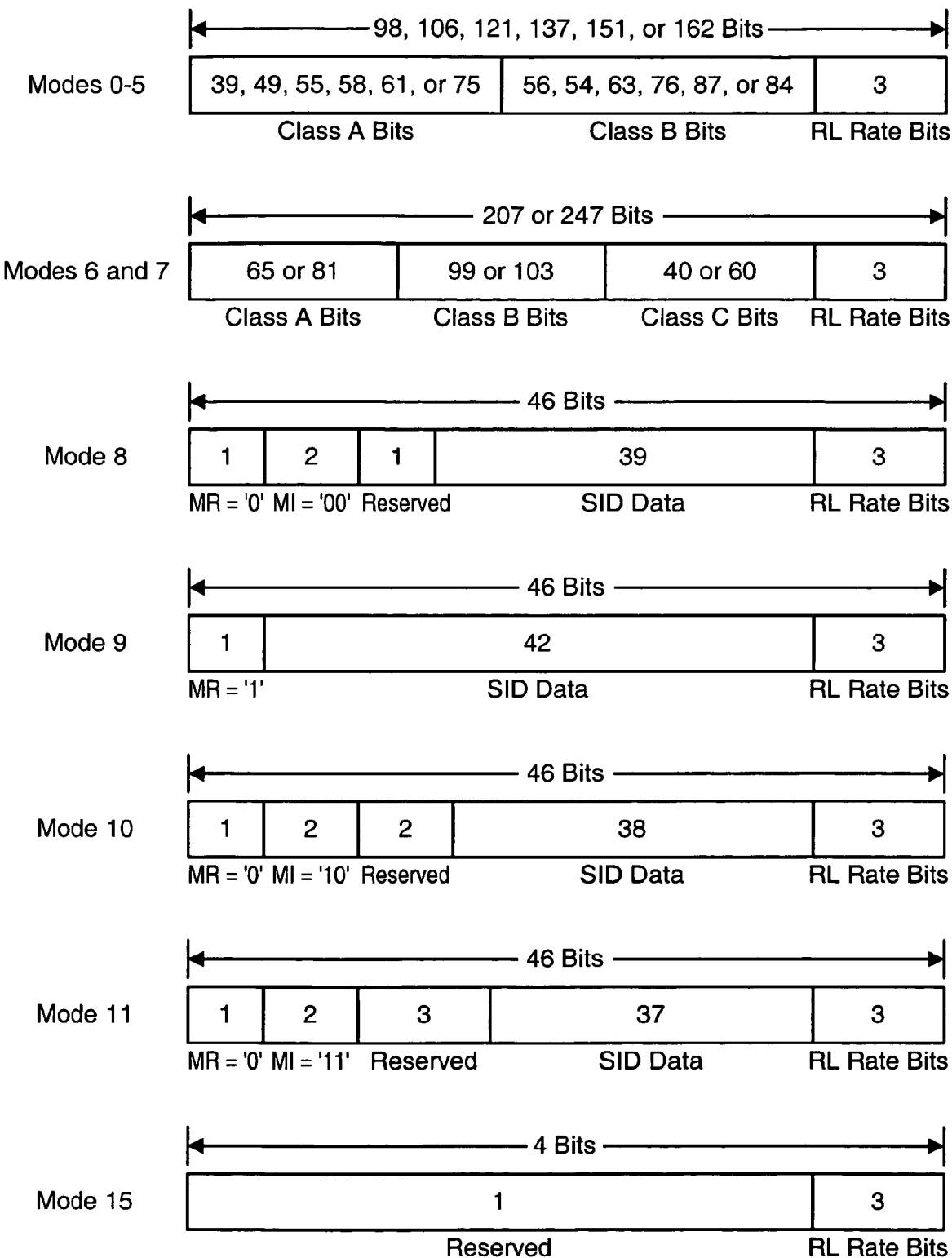
FIGS. 4 and 5 are diagrams showing the frame formats for the supported AMR modes for the forward and reverse links, respectively.

FIG. 4 is a diagram showing the frame formats for the supported AMR modes on the forward link. As shown in FIG. 4 and Table 1, the frames for AMR modes 0 through 5 include a number of Class A bits and a number of Class B bits, with the specific number of bits in each class being dependent on the particular AMR mode. The frames for AMR modes 6 and 7 include a number of bits for Class A, B, and C, again with the specific number of bits in each class being dependent on the particular AMR mode. For each frame, the left-most bits are sent first.

The frames for AMR modes 8 through 11 (i.e., the SID frames) include the SID data and the maximum rate indicator (MR) bit, and may further include the mode indicator (MI) bits and reserve bits, as shown in FIG. 4 and Table 2. The frame for AMR mode 15 includes one reserved bit. The forward link frame for each AMR mode further includes three reverse link speech rate bits.

Figure 5:
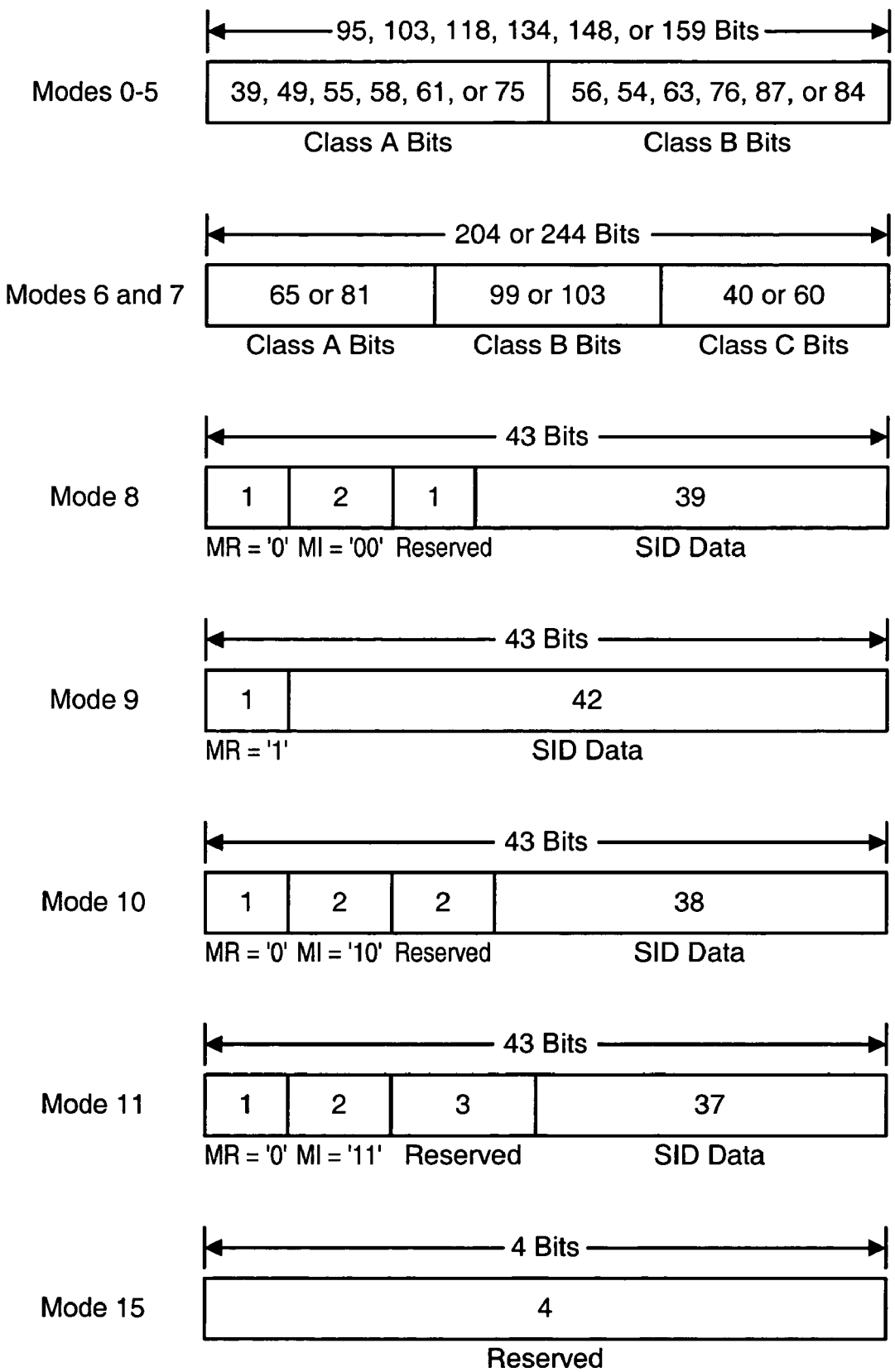

FIG. 5 is a diagram showing the frame formats for the supported AMR modes on the reverse link. The frames for AMR modes 0 through 11 on the reverse link have the same format as the corresponding frames on the forward link, minus the three reverse link speed rate bits. The frame for AMR mode 15 includes four reserve bits.

In accordance with an aspect of the invention, blind rate detection is used to detect the transmitted frames for the supported AMR modes. With blind rate detection, each received frame is decoded based on a number of hypotheses, with each hypothesis associated with a particular set of decoding parameter values used to decode the received frame. For example, a hypothesis may hypothesize a particular data rate, code rate, and so on, used at the transmitting source for the received frame. The hypothesis that yields the best quality metric (e.g., a CRC checked frame) is deemed as the correct one, and the frame decoded based on this hypothesis is selected as the transmitted frame.

To support blind rate detection, the number of bits provided to the CRC generator should be different for each of the possible blind rates to be detected (i.e., each of the AMR modes desired to be detected separately). If two or more blind rates have the same number of bits, then additional overhead bits are needed to distinguish between these rates.

For any particular negotiated AMR service, at most four speech rates are possible. In this case, the AMR modes listed in Table 1 may be supported, for example, by six different frame rates. These six frame rates may include four frame rates used for speech data (AMR mode 0 through 7), one frame rate used for silence descriptor (SID) (AMR modes 8 through 11), and one frame rate used for no transmission (AMR mode 15). The frames for the four types of SID (for AMR modes 8 through 11) may be defined to have the same length (e.g., 43 bits) and thus share the same frame rate.

At the receiving unit, there are six possible blind rates to detect. Since the SID frames for the four SID types share the same frame rate, the blind rate detection is only able to determine whether or not a received frame is a SID frame. One or more additional format bits are included in each SID frame to allow for identification of the particular SID type, as described above in Tables 2 and 3. The use of blind rate detection obviates the need to send overhead bits in each frame to identify the particular AMR mode being used.

In a cdma2000 system, voice and packet data may be transmitted on one or more traffic channels over the forward and reverse links. (A traffic channel is akin to a physical channel in the W-CDMA system.) In the cdma2000 system, voice data is typically transmitted over a fundamental channel (FCH), traffic data is typically transmitted over a supplemental channel (SCH), and signaling may be transmitted over a dedicated control channel (DCCH). The FCH, DCCH, and SCH are different types of traffic channel. To receive a high-speed data transmission on the SCH, a remote terminal is also typically assigned a FCH or DCCH.

In the cdma2000 system, each assigned traffic channel is associated with a particular radio configuration (RC) that defines the traffic channel's characteristics. These characteristics may be defined by various physical layer parameters such as the (convolutional or Turbo) code rate (R), the modulation characteristics, the spreading rate (SR), and so on. Each radio configuration further supports up to ten different data rates ranging from 1.5 Kbps to 1.0368 Mbps, which correspond to 30 to 20,736 bits per 20 msec frame. The radio configurations also support flexible rates whereby data may be transmitted at data rates ranging from 750 bps to 1.0368 Mbps.

Table 4 lists the radio configurations and the associated parameter values for some of the flexible data rates for the forward fundamental channel, as defined by the cdma2000 standard. The data rates listed in may be used to support the AMR modes listed in Table 1.

TABLE 4

Forward Traffic Channel Frame Structure for the Fundamental Channel and Some Supported Flexible Data Rates

| Radio Config. | Number of Bits/Frame | | | |
|---|---|---|---|---|
| | Total | Information | CRC | Tail |
| 3, 4, 6, and 7 | 17 to 96 | 1 to 80 | 8 | 8 |
| | 21 to 192 | 1 to 172 | 12 | 8 |
| 5, 8, and 9 | 17 to 72 | 1 to 56 | 8 | 8 |
| | 21 to 288 | 1 to 268 | 12 | 8 |

Table 5 lists the code rate and interleaver size for radio configurations 3 through 9 for the forward link, as defined by the cdma2000 standard.

TABLE 5

Radio Configuration Characteristics for the Forward Fundamental Channel

| Radio Config. | Code Rate | Interleaver Size |
|---|---|---|
| 3 | ¼ | 768 |
| 4 | ½ | 384 |
| 5 | ¼ | 768 |
| 6 | ⅙ | 1152 |
| 7 | ⅓ | 576 |
| 8 | ¼ | 1152 |
| 9 | ½ | 576 |

In accordance with an aspect of the invention, the AMR modes listed in Table 1 are supported by a number of radio configurations on the forward and reverse links using the flexible rate feature supported by the cdma2000 standard. In an embodiment, a 12-bit CRC is selected for AMR speech frames (AMR modes 0 through 7) and an 8-bit CRC is selected for SID frames (AMR modes 8 through 11). These CRC selections provide good performance while minimizing the number of overhead bits used for each frame.

Tables 6 through 12 show an embodiment for supporting the AMR modes listed in Table 1 using radio configurations 3 through 9, respectively, for the forward link. In each of these tables, the number of information bits (column 2) for the AMR speech frames (AMR modes 0 through 7) is the sum of the Class A, B, and C bits and the three RL speech rate bits. The number of information bits for each SID frame is the sum of the SID bits, the format bits, and the three RL speech rate bits. The encoder input (column 5) includes the total information bits from column 2 plus the 8 or 12 CRC bits (column 3) and the 8 tail bits (column 4). For each radio configuration, the code rate is defined by the cdma2000 standard. For a code rate of ¼, four code bits are generated for each information bit, and the number of bits at the encoder output (column 6) is four times the number of bits provided to the encoder input. The interleaver size (column 7) is fixed for a particular radio configuration.

For radio configurations 3, 4, 6, and 7, the two highest AMR rates in modes 6 and 7 are not supported. These radio configurations are based on Rate Set 1 (9.6 kbps) where the maximum number of information bits per frame is 172 for the fundamental channel. To accommodate the higher AMR rates, a radio configuration based on Rate Set 2 (14.4 kbps), which provides up to 268 information bits per frame, can be used. For example, radio configurations 3 and 5 use a rate ¼ encoder with a 768-symbol interleaver. However, radio configuration 5 supports up to 268 information bits per fundamental channel frame while radio configuration 3 only supports up to 172 information bits. The flexible rate parameters are the same for radio configurations 3 and 5 for the lower rate AMR modes, but radio configuration 5 is able to support all AMR modes listed in Table 1. Thus, for most AMR applications, radio configuration 5 may be used instead of radio configuration 3.

TABLE 6

Forward Link Coding with Radio Configuration 3 (SR1, R = ¼)

| AMR Mode Index | Number of Bits/Frame | | | | | Interleaver Size |
|---|---|---|---|---|---|---|
| | Information | CRC | Tail | Encoder Input | Encoder Output | |
| 0 | 98 | 12 | 8 | 118 | 472 | 768 |
| 1 | 106 | 12 | 8 | 126 | 504 | 768 |
| 2 | 121 | 12 | 8 | 141 | 564 | 768 |
| 3 | 137 | 12 | 8 | 157 | 628 | 768 |
| 4 | 151 | 12 | 8 | 171 | 684 | 768 |
| 5 | 162 | 12 | 8 | 182 | 728 | 768 |
| 6 | 207 | | | Not Supported | | |
| 7 | 247 | | | Not Supported | | |
| 8 | 42 + 4 | 8 | 8 | 62 | 248 | 768 |
| 9 | 45 + 1 | 8 | 8 | 62 | 248 | 768 |
| 10 | 41 + 5 | 8 | 8 | 62 | 248 | 768 |
| 11 | 40 + 6 | 8 | 8 | 62 | 248 | 768 |
| 12-14 | TBD | TBD | 8 | TBD | TBD | 768 |
| 15 | 3 + 1 | 12 | 8 | 24 | 96 | 768 |

TABLE 7

Forward Link Coding with Radio Configuration 4 (SR1, R = ½)

| AMR Mode Index | Number of Bits/Frame | | | | | Interleaver Size |
|---|---|---|---|---|---|---|
| | Information | CRC | Tail | Encoder Input | Encoder Output | |
| 0 | 98 | 12 | 8 | 118 | 236 | 384 |
| 1 | 106 | 12 | 8 | 126 | 252 | 384 |
| 2 | 121 | 12 | 8 | 141 | 282 | 384 |
| 3 | 137 | 12 | 8 | 157 | 314 | 384 |
| 4 | 151 | 12 | 8 | 171 | 342 | 384 |
| 5 | 162 | 12 | 8 | 182 | 364 | 384 |
| 6 | 207 | | | Not Supported | | |
| 7 | 247 | | | Not Supported | | |
| 8 | 42 + 4 | 8 | 8 | 62 | 124 | 384 |
| 9 | 45 + 1 | 8 | 8 | 62 | 124 | 384 |
| 10 | 41 + 5 | 8 | 8 | 62 | 124 | 384 |
| 11 | 40 + 6 | 8 | 8 | 62 | 124 | 384 |
| 12-14 | TBD | TBD | 8 | TBD | TBD | 384 |
| 15 | 3 + 1 | 12 | 8 | 24 | 48 | 384 |

TABLE 8

Forward Link Coding with Radio Configuration 5 (SR1, R = ¼)

| AMR Mode Index | Number of Bits/Frame | | | | | Interleaver Size |
|---|---|---|---|---|---|---|
| | Information | CRC | Tail | Encoder Input | Encoder Output | |
| 0 | 98 | 12 | 8 | 118 | 472 | 768 |
| 1 | 106 | 12 | 8 | 126 | 504 | 768 |
| 2 | 121 | 12 | 8 | 141 | 564 | 768 |
| 3 | 137 | 12 | 8 | 157 | 628 | 768 |
| 4 | 151 | 12 | 8 | 171 | 684 | 768 |
| 5 | 162 | 12 | 8 | 182 | 728 | 768 |
| 6 | 207 | 12 | 8 | 227 | 908 | 768 |
| 7 | 247 | 12 | 8 | 267 | 1,068 | 768 |
| 8 | 42 + 4 | 8 | 8 | 62 | 248 | 768 |
| 9 | 45 + 1 | 8 | 8 | 62 | 248 | 768 |
| 10 | 41 + 5 | 8 | 8 | 62 | 248 | 768 |
| 11 | 40 + 6 | 8 | 8 | 62 | 248 | 768 |
| 12-14 | TBD | TBD | 8 | TBD | TBD | 768 |
| 15 | 3 + 1 | 12 | 8 | 24 | 96 | 768 |

TABLE 9

Forward Link Coding with Radio Configuration 6 (SR3, R = ⅙)

| AMR Mode Index | Number of Bits/Frame | | | | | Interleaver Size |
|---|---|---|---|---|---|---|
| | Information | CRC | Tail | Encoder Input | Encoder Output | |
| 0 | 98 | 12 | 8 | 118 | 708 | 1,152 |
| 1 | 106 | 12 | 8 | 126 | 756 | 1,152 |
| 2 | 121 | 12 | 8 | 141 | 846 | 1,152 |
| 3 | 137 | 12 | 8 | 157 | 942 | 1,152 |
| 4 | 151 | 12 | 8 | 171 | 1,026 | 1,152 |
| 5 | 162 | 12 | 8 | 182 | 1,092 | 1,152 |
| 6 | 207 | | | Not Supported | | |
| 7 | 247 | | | Not Supported | | |
| 8 | 42 + 4 | 8 | 8 | 62 | 372 | 1,152 |
| 9 | 45 + 1 | 8 | 8 | 62 | 372 | 1,152 |
| 10 | 41 + 5 | 8 | 8 | 62 | 372 | 1,152 |
| 11 | 40 + 6 | 8 | 8 | 62 | 372 | 1,152 |
| 12-14 | TBD | TBD | 8 | TBD | TBD | 1,152 |
| 15 | 3 + 1 | 12 | 8 | 24 | 144 | 1,152 |

TABLE 10

Forward Link Coding with Radio Configuration 7 (SR3, R = ⅓)

| AMR Mode Index | Number of Bits/Frame | | | | | Interleaver Size |
|---|---|---|---|---|---|---|
| | Information | CRC | Tail | Encoder Input | Encoder Output | |
| 0 | 98 | 12 | 8 | 118 | 354 | 576 |
| 1 | 106 | 12 | 8 | 126 | 378 | 576 |
| 2 | 121 | 12 | 8 | 141 | 423 | 576 |
| 3 | 137 | 12 | 8 | 157 | 471 | 576 |
| 4 | 151 | 12 | 8 | 171 | 513 | 576 |
| 5 | 162 | 12 | 8 | 182 | 546 | 576 |
| 6 | 207 | | | Not Supported | | |
| 7 | 247 | | | Not Supported | | |
| 8 | 42 + 4 | 8 | 8 | 62 | 186 | 576 |
| 9 | 45 + 1 | 8 | 8 | 62 | 186 | 576 |
| 10 | 41 + 5 | 8 | 8 | 62 | 186 | 576 |
| 11 | 40 + 6 | 8 | 8 | 62 | 186 | 576 |
| 12-14 | TBD | TBD | 8 | TBD | TBD | 576 |
| 15 | 3 + 1 | 12 | 8 | 24 | 72 | 576 |

TABLE 11

Forward Link Coding with Radio Configuration 8 (SR3, R = ¼)

| AMR Mode Index | Number of Bits/Frame | | | | | Interleaver Size |
|---|---|---|---|---|---|---|
| | Information | CRC | Tail | Encoder Input | Encoder Output | |
| 0 | 98 | 12 | 8 | 118 | 472 | 1,152 |
| 1 | 106 | 12 | 8 | 126 | 504 | 1,152 |
| 2 | 121 | 12 | 8 | 141 | 564 | 1,152 |
| 3 | 137 | 12 | 8 | 157 | 628 | 1,152 |
| 4 | 151 | 12 | 8 | 171 | 684 | 1,152 |
| 5 | 162 | 12 | 8 | 182 | 728 | 1,152 |
| 6 | 207 | 12 | 8 | 227 | 908 | 1,152 |
| 7 | 247 | 12 | 8 | 267 | 1,068 | 1,152 |
| 8 | 42 + 4 | 8 | 8 | 62 | 248 | 1,152 |
| 9 | 45 + 1 | 8 | 8 | 62 | 248 | 1,152 |
| 10 | 41 + 5 | 8 | 8 | 62 | 248 | 1,152 |
| 11 | 40 + 6 | 8 | 8 | 62 | 248 | 1,152 |
| 12-14 | TBD | TBD | 8 | TBD | TBD | 1,152 |
| 15 | 3 + 1 | 12 | 8 | 24 | 96 | 1,152 |

TABLE 12

Forward Link Coding with Radio Configuration 9 (SR3, R = ½)

| AMR Mode Index | Number of Bits/Frame | | | | | Interleaver Size |
|---|---|---|---|---|---|---|
| | Information | CRC | Tail | Encoder Input | Encoder Output | |
| 0 | 98 | 12 | 8 | 118 | 236 | 576 |
| 1 | 106 | 12 | 8 | 126 | 252 | 576 |
| 2 | 121 | 12 | 8 | 141 | 282 | 576 |
| 3 | 137 | 12 | 8 | 157 | 314 | 576 |
| 4 | 151 | 12 | 8 | 171 | 342 | 576 |
| 5 | 162 | 12 | 8 | 182 | 364 | 576 |
| 6 | 207 | 12 | 8 | 227 | 454 | 576 |
| 7 | 247 | 12 | 8 | 267 | 534 | 576 |
| 8 | 42 + 4 | 8 | 8 | 62 | 124 | 576 |
| 9 | 45 + 1 | 8 | 8 | 62 | 124 | 576 |
| 10 | 41 + 5 | 8 | 8 | 62 | 124 | 576 |
| 11 | 40 + 6 | 8 | 8 | 62 | 124 | 576 |
| 12-14 | TBD | TBD | 8 | TBD | TBD | 576 |
| 15 | 3 + 1 | 12 | 8 | 24 | 48 | 576 |

Table 13 lists the radio configurations and the associate parameter values for some of the flexible data rates for the reverse fundamental channel, as defined by the cdma2000 standard. The flexible data rates listed in Table 13 may be used to support the AMR modes listed in Table 1. Radio configurations 3 through 6 on the reverse link utilize a rate ¼ encoder and a 1536-symbol interleaver.

TABLE 13

Reverse Traffic Channel Frame Structure for the Fundamental Channel and Some Supported Flexible Data Rates

| Radio Config. | Number of Bits/Frame | | | |
|---|---|---|---|---|
| | Total | Information | CRC | Tail |
| 3 and 5 | 17 to 96 | 1 to 80 | 8 | 8 |
| | 21 to 192 | 1 to 172 | 12 | 8 |
| 4 and 6 | 17 to 72 | 1 to 56 | 8 | 8 |
| | 21 to 288 | 1 to 268 | 12 | 8 |

Table 14 shows an embodiment for supporting the AMR modes using radio configuration 4 or 6 for the reverse link. In Table 14, the number of information bits (column 2) for the AMR speech frames (AMR modes 0 through 7) is the sum of the Class A, B, and C bits. The number of information bits for each SID frame is the sum of the SID bits and the format bits. The encoder input (column 5) includes the total information bits from column 2, the 8 or 12 CRC bits (column 3), and the 8 tail bits (column 4). For code rate ¼, four code bits are generated for each information bit, and the number of bits at the encoder output (column 6) is four times the number of bits provided to the encoder input. The interleaver size (column 7) is defined by the cdma2000 standard.

Table 14 provides an implementation to support AMR data using radio configurations 4 and 6, which are based on Rate Set 2 (14.4 kbps). If radio configurations 3 and 5, which are based on Rate Set 1 (9.6 kbps), are used, the parameters would be the same as shown in Table 14 for radio configurations 4 and 6, with the exception that the two highest AMR rates for AMR modes 6 and 7 would not be supported. Thus, radio configuration 4 or 6 should be used instead of radio configurations 3 and 5.

TABLE 14

Reverse Link Coding with Radio Configuration 4 or 6

| AMR Mode Index | Number of Bits/Frame | | | | | Interleaver Size |
|---|---|---|---|---|---|---|
| | Information | CRC | Tail | Encoder Input | Encoder Output | |
| 0 | 95 | 12 | 8 | 115 | 460 | 1,536 |
| 1 | 103 | 12 | 8 | 123 | 492 | 1,536 |
| 2 | 118 | 12 | 8 | 138 | 552 | 1,536 |
| 3 | 134 | 12 | 8 | 154 | 616 | 1,536 |
| 4 | 148 | 12 | 8 | 168 | 672 | 1,536 |
| 5 | 159 | 12 | 8 | 179 | 716 | 1,536 |
| 6 | 204 | 12 | 8 | 224 | 896 | 1,536 |
| 7 | 244 | 12 | 8 | 264 | 1,056 | 1,536 |
| 8 | 39 + 4 | 8 | 8 | 59 | 236 | 1,536 |
| 9 | 42 + 1 | 8 | 8 | 59 | 236 | 1,536 |
| 10 | 38 + 5 | 8 | 8 | 59 | 236 | 1,536 |
| 11 | 37 + 6 | 8 | 8 | 59 | 236 | 1,536 |
| 12-14 | TBD | TBD | 8 | TBD | TBD | 1,536 |
| 15 | 0 + 4 | 12 | 8 | 24 | 96 | 1,536 |

To support the AMR modes listed in Table 1, signaling information associated with the AMR data may be sent (1) on a dedicated control channel (DCCH), (2) as a blank-and-burst frame on the traffic channel used to send the AMR data, or (3) via some other signaling mechanism. In an embodiment, signaling information for the AMR data is not sent as a "dim-and-burst" frame on the traffic channel.

Figure 6:
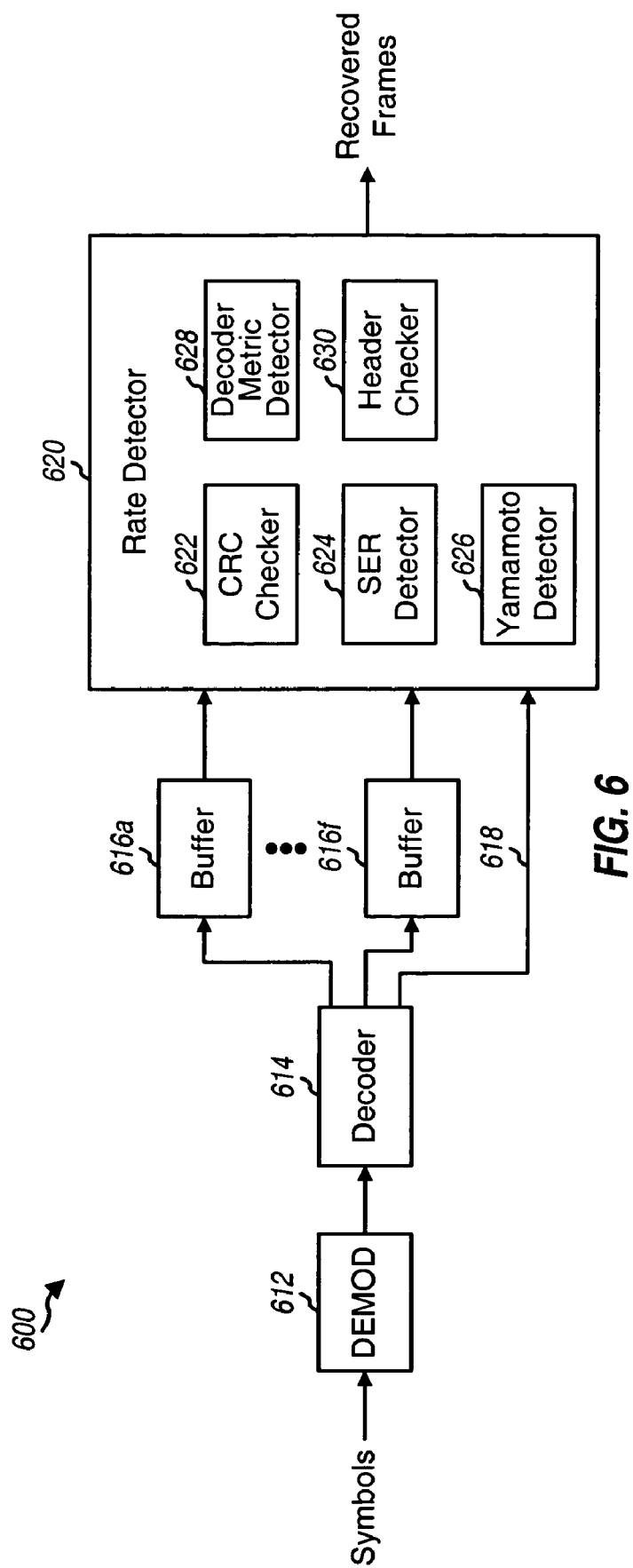
FIG. 6 is a block diagram of an embodiment of a receiving unit capable of processing an AMR frame.

FIG. 6 is a block diagram of an embodiment of a receiving unit 600 capable of processing an AMR frame. A demodulator (DEMOD) 612 receives and demodulates (eg., despreads, decovers, and pilot demodulates) the samples from a preceding unit and provides demodulated frames. A multi-rate decoder 614 receives and decodes each demodulated frame in accordance with a set of rate hypotheses. Each rate hypothesis corresponds to a particular hypothesized rate for the received frame, and is associated with a particular set of processing (e.g., CRC, encoding, and interleaving) parameter values used for that rate. For each rate hypothesis, decoder 614 performs error-correction decoding and provides a decoded frame to a respective buffer 616. As shown in FIG. 6, a number of buffers 616a through 616f are provided for a number of blind rates. For example, six buffers are used for the six blind rates to be detected for the AMR modes listed in Table 1, as noted above. Fewer or additional hypotheses for other blind rates may also be supported and are within the scope of the invention.

A rate detector 620 receives the decoded frames from buffers 616 and selects one of the decoded frames as the transmitted frame. In the embodiment shown in FIG. 6, rate detector 620 includes a CRC checker 622, a symbol error rate (SER) detector 624, a Yamamoto metric detector 626, a decoder metric detector 628, and a header checker 630. Rate detector 620 may be implemented with only a subset of these checkers and detectors, or may employ different or additional checkers and detectors.

CRC checker 622 locally generates a CRC value for the data block in each decoded frame, and determines whether or not the locally generated CRC value matches the CRC value in the decoded frame. This CRC check is performed for the decoded frames for all rate hypotheses. CRC checker 622 provides a number of check bits (e.g., C1, C2, and so on), one check bit for each of the possible blind rates being detected.

SER detector 624 receives the decoded bits from buffers 616 and an estimate of the received symbols via a line 618. SER detector 624 then re-encodes the decoded bits, compares the re-encoded symbols to the received symbols, counts the number of discrepancies between the re-encoded symbols and the received symbols, and provides a symbol error rate (SER) indicative of the number of discrepancies. SER detector 624 provides a number of SER values (e.g., SER1, SER2, and so on), one SER value for each of the possible blind rates being detected. The SER values for different frame rates are typically normalized to account for the difference in the number of symbols per frame. The SER values may be used, in addition to the CRC bits, to determine the rate and integrity of the current frame.

Yamamoto metric detector 626 provides a confidence metric based on a difference between the selected path through a trellis and the next closest path through the trellis. While the CRC check is dependent on the bits in each of the decoded frames, the Yamamoto check is dependent on the frame processing prior to the decoding. Yamamoto detector 626 provides a number of Yamamoto values (e.g., Y1, Y2, and so on), one Yamamoto value for each of the possible blind rates being detected.

Decoder metric detector 628 provides a metric indicative of the confidence of the decoded frames, such as the Viterbi decoder metric for the selected decoder trellis output path.

Rate detector 620 receives the CRC check bits from CRC checker 622, the SER values from SER detector 624, and the Yamamoto values from the Yamamoto detector 626. Rate detector 620 then determines which one of the possible rates is the actual rate of the received frame. Rate detector 620 employs a particular rate determination algorithm that weighs the results from the CRC check, SER detection, Yamamoto detection, or a combination thereof, and provides an estimate of the received frame rate based on these results. Once the rate of the received frame is determined, rate detector 620 provides a signal to the proper buffer 616 to provide the decoded frame, which may be further processed. No frame may be provided if an erasure is declared (e.g., all CRC checks failed for the received frame), and the frame is deemed as being received in error. Alternatively or additionally, rate detector 620 may provide a signal indicative of a frame erasure if an erasure is declared.

For a received frame declared as being a SID frame, header checker 630 checks the format bits to determine which type of SID has been received. Header checker 630 may also provide a signal indicative of the particular SID type detected.

Decoder 614 may be implemented as a multi-rate Viterbi decoder described in U.S. Pat. No. 5,710,784, entitled "MULTIRATE SERIAL VITERBI DECODER FOR CDMA SYSTEM APPLICATIONS." Techniques for performing blind rate detection are described in U.S. Pat. No. 5,751,725, entitled "METHOD AND APPARATUS FOR DETERMINING THE RATE OF RECEIVED DATA IN A VARIABLE RATE COMMUNICATION SYSTEM," U.S. Pat. No. 5,774,496, entitled "METHOD AND APPARATUS FOR DETERMINING DATA RATE OF TRANSMITTED VARIABLE RATE DATA IN A COMMUNICATIONS RECEIVER," and U.S. Pat. No. 6,108,372, entitled "METHOD AND APPARATUS FOR DECODING VARIABLE RATE DATA USING HYPOTHESIS TESTING TO DETERMINE DATA RATE." These patents are assigned to the assignee of the present invention and incorporated herein by reference.

In FIGS. 3 and 6, the processing units in the transmitting source (e.g., the base station) and the receiving device (e.g., the remote terminal) may be implemented by various means. For example, demodulator 612, decoder 614, and rate detector 620 in FIG. 6 may be implemented with hardware, software, or a combination thereof. For a hardware implementation, the processing units may be implemented within one or more application specific integrated circuits (ASICs), digital signal processors (DSPs), programmable logic devices (PLDs), controllers, micro-controllers, microprocessors, other electronic units designed to perform the functions described herein, or a combination thereof.

For a software implementation, these processing units may be implemented with modules (e.g., procedures, functions, and so on) that perform the functions described herein. For example, the decoding, CRC check, SER detection, Yamamoto detection, blind rate determination, and/or other functions may be implemented with software code stored in a memory unit and executed by a processor.

For clarity, various aspects, embodiments, and features of the invention have been described for a specific implementation for a cdma2000 system. However, other CDMA systems and standards may advantageously be implemented or adopted to support the AMR modes described herein and other modes.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for receiving data bits associated with an adaptive multi-rate (AMR) speech coder, comprising:
   receiving a frame having included therein a CRC value and a plurality of data bits associated with the AMR speech coder, wherein the received frame is associated with one of a plurality of possible frame rates, and wherein each of the plurality of possible frame rates is associated with a different data field length over which the CRC value is generated;
   calculating a plurality of potential CRC values for the received frame in accordance with a plurality of different data field lengths;
   comparing the plurality of potential CRC values with the CRC value in the received frame to determine the data field length used to encode the CRC value in the received frame;
   detecting a frame rate of the received frame based on the determined data field length; and
   extracting the plurality of data bits from the received frame based at least in part on the detected frame rate;
   wherein the plurality of possible frame rates include at least one frame rate being used for AMR speech frames, at least one frame rate being used for silence descriptor (SID) frames, and at least one frame rate being used for blank frames.

2. The method of claim 1, further comprising:

decoding the received frame in accordance with a plurality of rate hypotheses to generate a plurality of decoded frames.

3. The method of claim 2, wherein the frame rate of the received frame is further detected based on symbol error rates for the plurality of decoded frames.

4. The method of claim 1, wherein the detecting is performed in accordance with a rate detection algorithm (RDA).

5. In a wireless communication system, a receiving entity operative to receive data bits associated with an adaptive multi-rate (AMR) speech coder, comprising:

a decoder configured to receive a frame having included therein a CRC value and a plurality of data bits associated with the AMR speech coder, calculate a plurality of potential CRC values for the received frame in accordance with a plurality of rate hypotheses, wherein each rate hypothesis corresponds to one of a plurality of possible frame rates for the received frame, and wherein each of the plurality of possible frame rates is associated with a different data field length over which a CRC is generated; and a rate detector coupled to the decoder and configured to compare the plurality of potential CRC values with the CRC value in the received frame to determine the data field length used to encode the CRC value in the received frame and determine a particular frame rate for the received frame based on the determined field length, and extract the plurality of data bits from the received frame based at least in part on the determined frame rate;

wherein the plurality of possible frame rates include at least one frame rate being used for AMR speech frames, at least one frame rate being used for silence descriptor (SID) frames, and at least one frame rate being used for blank frames.

6. The receiving entity of claim 5, wherein the rate detector includes a symbol error rate (SER) detector configured to provide a plurality of SER values for a plurality of decoded frames, wherein the frame rate of the received frame is determined further based on the plurality of SER values.

7. The receiving entity of claim 5, wherein the rate detector includes a Yamamoto detector configured to provide a plurality of Yamamoto values for a plurality of decoded frames, wherein the frame rate of the received frame is determined further based on the plurality of Yamamoto values.

8. The receiving entity of claim 5, wherein the frame rate of the received frame is determined based on the results of CRC check, symbol error rates, Yamamoto values, or a combination thereof, obtained for the plurality of decoded frames.

9. An apparatus for receiving data bits associated with an adaptive multi-rate (AMR) speech coder, comprising:

means for receiving a frame having, included therein a CRC value and a plurality of data bits associated with the AMR speech coder, wherein the received frame is associated with one of a plurality of possible frame rates, and wherein each of the plurality of possible frame rates is associated with a different data field length over which the CRC value is generated;

means for calculating a plurality of potential CRC values for the received frame in accordance with a plurality of different data field lengths;

means for comparing the plurality of potential CRC values with the CRC value in the received frame to determine the data field length used to encode the CRC value in the received frame;

means for detecting a frame rate of the received frame based on the determined data field length; and means for extracting the plurality of data bits from the received frame based at least in part on the detected frame rate;

wherein the plurality of possible frame rates include at least one frame rate being used for AMR speech frames, at least one frame rate being used for silence descriptor (SID) frames, and at least one frame rate being used for blank frames.

10. The apparatus of claim 9, further comprising:

means for decoding the received frame in accordance with a plurality of rate hypotheses to generate a plurality of decoded frames.

11. The apparatus of claim 10, further comprising:

means for determining symbol error rates for the plurality of decoded frames; and wherein the frame rate of the received frame is detected further based on the symbol error rates for the plurality of decoded frames.

12. A memory storing a computer program that, when executed, causes a computer to perform the acts of:

receiving a frame having included therein a CRC value and a plurality of data bits associated with the AMR speech coder, wherein the received frame is associated with one of a plurality of possible frame rates, and wherein each of the plurality of possible frame rates is associated with a different data field length over which the CRC value is generated;

calculating a plurality of potential CRC values for the received frame in accordance with a plurality of different data field lengths;

comparing the plurality of potential CRC values with the CRC value in the received frame to determine the data field length used to encode the CRC value in the received frame;

detecting a frame rate of the received frame based on the determined data field length; and extracting the plurality of data bits from the received frame based at least in part on the detected frame rate;

wherein the plurality of possible frame rates include at least one frame rate being used for AMR speech frames, at least one frame rate being used for silence descriptor (SID) frames, and at least one frame rate being used for blank frames.

13. The memory of claim 12 storing the computer program that, when executed, causes a computer to further perform the acts of:

decoding the received frame in accordance with a plurality of rate hypotheses to generate a plurality of decoded frames.

14. The memory of claim 13 storing the computer program wherein the frame rate of the received frame is further detected based on symbol error rates for the plurality of decoded frames.

15. The memory of claim 12 storing the computer program wherein the detecting is performed in accordance with a rate detection algorithm (RDA).

* * * * *

UNITED STATES PATENT AND TRADEMARK OFFICE
CERTIFICATE OF CORRECTION

| | | |
|---|---|---|
| PATENT NO. | : 7,746,832 B2 | Page 1 of 1 |
| APPLICATION NO. | : 11/266623 | |
| DATED | : June 29, 2010 | |
| INVENTOR(S) | : Odenwalder | |

It is certified that error appears in the above-identified patent and that said Letters Patent is hereby corrected as shown below:

Column 14, line 66, claim 1: "include" to read as --includes--

Column 15, line 34, claim 5: "include" to read as --includes--

Column 16, line 10, claim 9: "include" to read as --includes--

Column 16, line 29, claim 12: "AMR" to read as --an adaptive multi-rate--

Column 16, line 47, claim 12: "include" to read as --includes--

Signed and Sealed this
Fifth Day of July, 2011

David J. Kappos
*Director of the United States Patent and Trademark Office*